United States Patent [19]

Tsai

[11] Patent Number: 4,688,552
[45] Date of Patent: Aug. 25, 1987

[54] GAS-FIRED SOLDERING IRON

[76] Inventor: Gee S. Tsai, No. 21, Chi Feng W. Road, Wu Feng Hsiang, Taichung Hsien, Taiwan

[21] Appl. No.: 893,107

[22] Filed: Aug. 1, 1986

[51] Int. Cl.[4] ............................................. B23K 3/02
[52] U.S. Cl. .................................................. 126/414
[58] Field of Search .................. 126/414, 413; 228/51, 228/52, 53; 219/229, 230

[56] References Cited

U.S. PATENT DOCUMENTS 869,140 10/1907 Mitchell ............................... 126/414
2,388,901 11/1945 Burrows ............................... 126/414

FOREIGN PATENT DOCUMENTS 2732365 2/1978 Fed. Rep. of Germany ...... 126/414

Primary Examiner—Randall L. Green
Attorney, Agent, or Firm—Morton J. Rosenberg

[57] ABSTRACT

A soldering iron comprising a gas container, a combustion chamber, an asbestos pad, a head, cooling fins, a filling button, a gas flow adjustment knob, a trigger, a refill cap, and a gas line. The filling button controls whether or not gas flows into the combustion chamber and the gas flow adjustment knob controls the flow rate of gas into the combustion chamber. A trigger lights the gas. An asbestos pad keeps the head from overheating and the cooling fins keep the combustion chamber from overheating.

2 Claims, 4 Drawing Figures

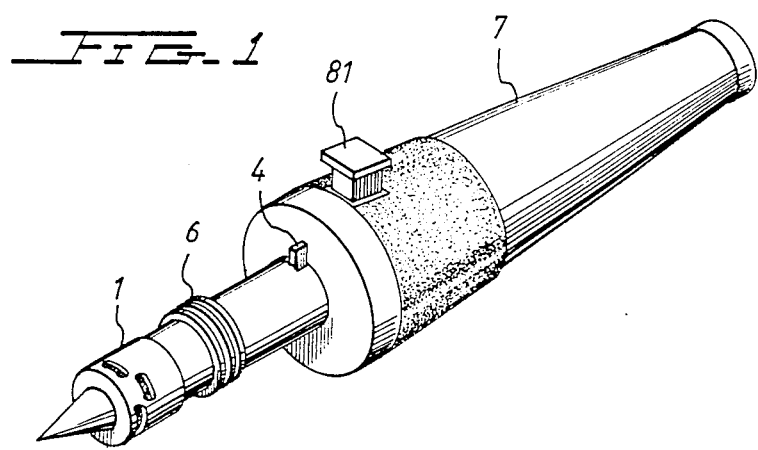

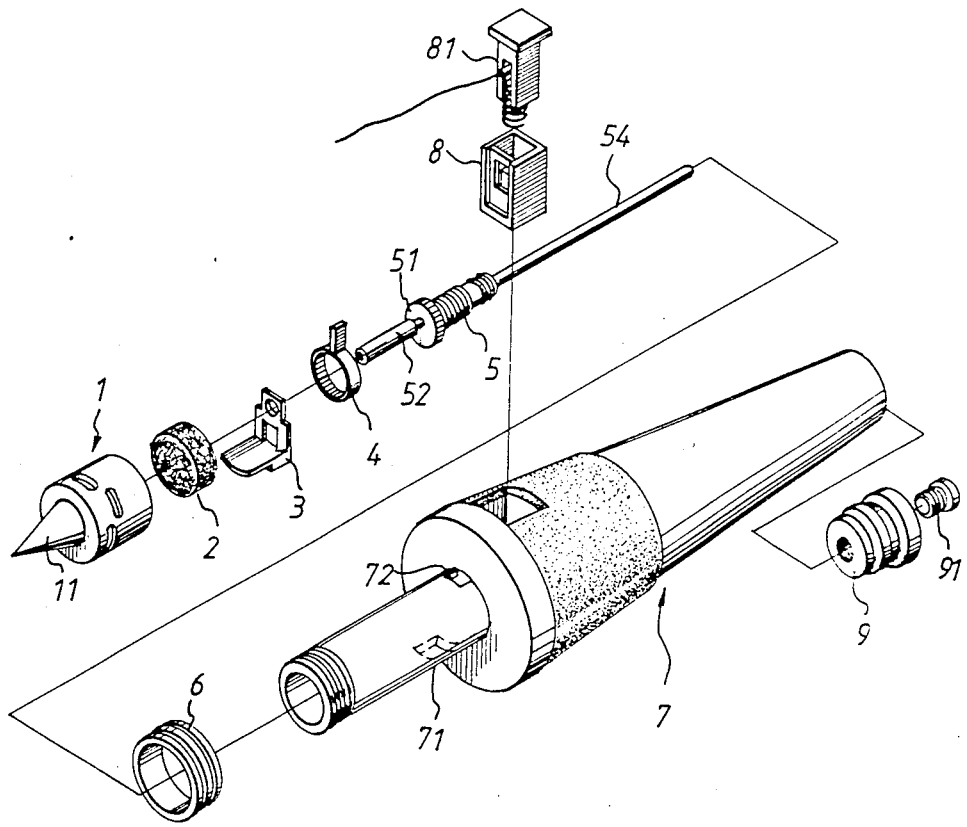
FIG_2

GAS-FIRED SOLDERING IRON

BACKGROUND OF THE INVENTION

This invention relates to a gas-fired soldering iron. In the past, all soldering irons were electrical. This presented the obvious problem that the soldering iron could only be used where there was an electrical supply. Furthermore, the electrical cord made the soldering iron rather awkward to work with. Finally, there was always the problem that electrical soldering irons are slow to warm up.

It is the purpose of this present invention, therefore, to mitigate and/or obviate the above-mentioned drawbacks in the manner set forth in the detailed description of the preferred embodiment.

SUMMARY

A primary objective of this invention is to provide a soldering iron which contains its own power source.

Another objective of this invention is to provide a soldering iron which heats up quickly.

A further objective of this invention is to provide a soldering iron which requires no power cord.

Further objectives and advantages of the present invention will become apparent as the following description proceeds, and the features of novelty which characterize the invention are pointed out with particularity in the claims annexed to and forming a part of this invention.

BRIEF DESCRIPTION OF THE DRAWINGS

FIG. 1 is a perspective view of the present invention;

FIG. 2 is an exploded view of the present invention;

DETAILED DESCRIPTION OF THE PREFERRED EMBODIMENT

Figure 4:
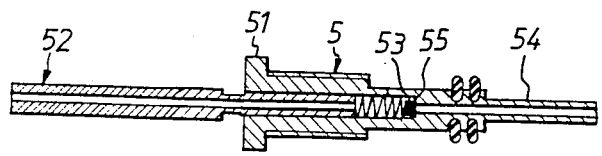
FIG. 4 is a cross-sectional view of the gas line of the present invention.

Referring to FIG. 1, it can be seen that the present invention comprises a head 1, cooling fins 6, an adjustment knob 4, a trigger 81, and a body 7.

Figure 3:
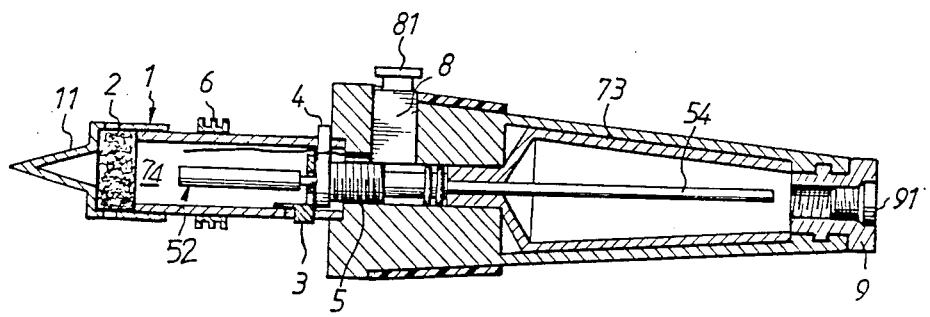
FIG. 3 is a cross-sectional view of the present invention.

The soldering iron of the present invention is gas (butane) fired. Referring to FIGS. 2 and 3, the gas container 73 of the present invention can be seen. Much like a cigarette lighter container, the gas container 73 of the present invention has a refill cap 9 with an injection insert 91 through which gas can be inserted when the gas container 73 is empty. Protruding into the gas container 73 is the gas line 54 through which gas is transferred through the gas line 5 to the combustion chamber 74. The gas line comprises a nozzle 52, an adjustment ring 51, a valve 53, a seat 55, and a gas tube 54. The adjustment ring 51 may be turned by the adjustment knob 4 so as to adjust the flow rate of gas into the combustion chamber 74. Since the gas line 5 is essentially the same as a pocket cigarette lighter gas line and its structure is obvious to anyone skilled in the art, details of its structure will not be presented herein.

Using the filling button 3, the nozzle 52 may be pulled forward, thereby filling the combustion chamber 74 with gas. The filling button 3 catches on a notch in the combustion chamber 74 and stays there until disconnected by the user (i.e.—until the soldering iron is turned off). The asbestos pad 2 is permeable so as to let air come in through the head 1. This lets burning take place in the combustion chamber 74. The combustion chamber 74 is initially filled by pulling the nozzle forward with the filling button 3. The filling button 3 is slideably adjustable about the lower portion of the combustion chamber 74 (see FIG. 2) and should only be used when first starting or when cutting off the soldering iron. A piezoelectric trigger 81 in a trigger box 8 is the means of providing a spark to ignite the gas coming through the gas line 5. A wire from the trigger box 8 protrudes into the combustion chamber 74 to form a substantially closed circuit (i.e. closed except at the spark gap between the nozzle 52 and the gas line 5) from the trigger box 8, which is grounded to the gas line 5, to the nozzle 52 to the gas line 5. When the piezoelectric trigger is pressed, a voltage drop is generated between the end of the wire and the tip of the nozzle 52, which lights the gas in the chamber 74.

Referring to FIGS. 1 and 2, it can also be seen that the present invention also has cooling fins 6 and a head tip 11 through which the heat is funneled. The cooling fins 6 prevent the outside of the combustion chamber 74 and the body 7 from overheating by dissipating extra heat.

Referring to FIG. 4, a close-up cross-sectional view of the gas line 5 can be seen. When the adjustment ring 51 is turned, the body of the gas line 5 is urged forwards or backwards, thereby further opening or closing spring-loaded valve 53. As the valve 53 is further separated from the seat 55 (i.e.—as the adjustment knob 4 is turned in the direction which would be into the page in FIG. 3), the gas flowrate is increased. If the valve 53 is moved closer to its seat (i.e.—the adjustment knob seen in FIG. 3 is turned the direction which would be coming out of the page), then the flowrate of gas is decreased.

To operate the present invention, the filling button 3 is pulled forward so that it catches on a notch inside the combustion chamber 74. This allows a steady stream of gas to enter the combustion chamber 74. Then the trigger 81 is briskly pressed down so as to light the gas. Once the gas is lighted, the flowrate can be adjusted by turning the adjustment knob 4. The present invention heats up much faster than an electrical soldering iron, so there is virtually no waiting period before usage. After using, the filling button 3 is released from its notch back to its original position. Since the nozzle 52 is spring loaded and the filling button 3 is connected to the nozzle 52, the filling button will return automatically to its original (non-use) position when released from the notch.

As various possible embodiments might be made of the above invention without departing from the scope of the invention, it is to be understood that all matter herein described or shown in the accompanying drawing is to be interpreted as illustrative and not in a limiting sense. Thus it will be appreciated that the drawings are exemplary of a preferred embodiment of the invention.

I claim:
1. A gas-fired soldering iron, comprising:
    a body member;
    a combustion chamber protruding from one end of said body member and having a soldering head threadably engaged on another end of said combustion chamber with a fire-proof air-permeable pad enclosed between said combustion chamber and said soldering head;

a gas container which is contained within a cavity of said body member for storing gas, said gas container having refilling means on one end thereof;

a gas line having a gas tube protruding into said gas container on one end thereof and having a nozzle projecting into said combustion chamber on another end thereof;

cooling fins being disposed around and contacting an outside surface of said combustion chamber to prevent overheating of said combustion chamber;

a filling button associated with said gas line and which is slideably adjustable about a lower portion of said combustion chamber for allowing a steady flow of gas to said combustion chamber;

a gas flowrate adjustment knob on a top rear portion of said combustion chamber for adjusting gas flowrate to said combustion chamber by turning an adjustment ring on said gas line; and, said body member additionally retaining a triggering device on a top front portion thereof, said triggering device causing gas to be ignited in said chamber when a trigger of said triggering device is pressed.

2. A gas-fired soldering iron, as set forth in claim 1, wherein said triggering device is electrically grounded to said nozzle of said gas line; a wire protruding from said triggering device into said chamber, an end of said wire being proximate to an open end of the nozzle; a piezoelectric device for causing a spark for igniting gas in said chamber when said trigger is pressed.

* * * * *